(12) United States Patent
Inhwan et al.

(10) Patent No.: US 6,219,714 B1
(45) Date of Patent: Apr. 17, 2001

(54) METHOD FOR SENDING E-MAIL MESSAGES IN A LOCAL AREA NETWORK, AND DEVICE FOR APPLYING SAME

(75) Inventors: Kim Inhwan, Suwon (KR); Konstantin Vitalievich Vyaznikov, Moscow (RU); Alexandr Mikhailovich Potryvaev, Schelkovo-5 (RU); Mikhail Jurievich Gnedovsky, Moscow (RU); Dmitry Pavlovich Krasnonosenkikh, Protvino (RU)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/117,249

(22) PCT Filed: Dec. 16, 1996

(86) PCT No.: PCT/RU96/00348

§ 371 Date: Jul. 27, 1998

§ 102(e) Date: Jul. 27, 1998

(87) PCT Pub. No.: WO98/27690

PCT Pub. Date: Jun. 25, 1998

(51) Int. Cl.[7] .................................................. G06F 15/173
(52) U.S. Cl. .......................... 709/238; 709/206; 709/232; 709/242; 709/246
(58) Field of Search .................................... 709/200, 206, 709/232, 238, 242, 246, 248

(56) References Cited

U.S. PATENT DOCUMENTS

| 4,800,488 | | 1/1989 | Agrawal et al. ...................... 364/200 |
|---|---|---|---|
| 5,408,333 | * | 4/1995 | Kojima et al. ........................ 358/400 |
| 5,424,724 | * | 6/1995 | Williams et al. ................ 340/825.05 |
| 5,475,819 | * | 12/1995 | Miller et al. .......................... 395/828 |
| 5,483,652 | * | 1/1996 | Sudama et al. ......................... 707/10 |
| 5,513,126 | * | 4/1996 | Harkins et al. ....................... 709/228 |
| 5,767,985 | * | 6/1998 | Yamamoto et al. .................. 358/402 |
| 5,819,044 | * | 10/1998 | Kawabe et al. ....................... 709/226 |
| 5,862,404 | * | 1/1999 | Onaga .................................. 395/828 |
| 5,870,089 | * | 2/1999 | Fabbio et al. ......................... 345/335 |
| 5,901,286 | * | 5/1999 | Danknick et al. .................... 709/203 |

FOREIGN PATENT DOCUMENTS

| 2089620 | 6/1982 | (GB) . |
|---|---|---|
| 1337902 | 9/1987 | (SU) . |
| 1695329 | 11/1991 | (SU) . |
| 0369802 | 5/1990 | (WO) . |

OTHER PUBLICATIONS

Abstract of SU1337902 of Sep. 1987.
Abstract of SU1695329 of Nov. 1991.

* cited by examiner

Primary Examiner—Saleh Najjar
(74) Attorney, Agent, or Firm—Ladas and Parry

(57) ABSTRACT

The invention relates to a method and apparatus for transmitting electronic mail messages in a local network using information of dynamic routing to provide the electronic mail with service of the required type. A message written by means of a user program 24 is sent to a queue dispatcher 25 which sends information on the address of reception and type of service for the electronic mail to unit 26 for determining a message transmission route. Unit 26 for determining a route controls routing table 27, changing it at the request of control unit 28, and transmits information on the network unit which is the point of destination to the queue dispatcher 25. A communication unit 29 transmits and receives electronic mail and data for making up the routing table.

11 Claims, 3 Drawing Sheets

METHOD FOR SENDING E-MAIL MESSAGES IN A LOCAL AREA NETWORK, AND DEVICE FOR APPLYING SAME

FIELD OF THE INVENTION

The present invention relates to methods and apparatuses for transmitting electronic mail messages, more concretely, it relates to a method and apparatus for transmitting electronic mail messages in a local network in which variable coupling of internetwork channels is carried out using information on the dynamic routing of messages being transmitted.

BACKGROUND ART

A traditionally known communication system for facsimile apparatuses is shown in FIG. 1, where reference numeral 1 designates a network of a Message Handling System (MHS) at the transmission end, reference numeral 2 designates a Packet Switching Data Network (PSDN), reference numeral 3 designates a Message Handling System at the receiving end, reference numeral 4 designates a Switched Public Service Telephone Network (PSTN) and reference numeral 5 designates a facsimile apparatus (telefax).

The communication system for facsimile apparatuses transmits electronic mail messages through the PSDN network 2 by displaying the fax number and electronic mail address using information 6 on a directory and converts the electronic mail message into the format of a facsimile message at the final destination point, thus realizing automatic transmission of messages over facsimile communications and reducing expenditures on carrying out communication.

At the transmission end 1 a user reads or writes a message meant to be transmitted, using a corresponding reading apparatus, for example a scanner 7 which is connected to user computers 8 and 9. The written message is converted into a message format for electronic mail and is transmitted along MIHS network channels at the transmitting end. When the converted electronic mail message reaches handling machinery 10 realizing the electronic mail mode, directory control apparatus 11 receives an enquiry on the address of the electronic mail corresponding to the fax number. The directory control apparatus 11 carries out a search for a corresponding address of electronic mail among the information of the directories using the fax number, and then the found address of electronic mail is sent to the handling machine 10. The handling machine 10, realizing the electronic mail mode, sends the converted electronic mail message through the PSDN network 2 using the electronic mail address.

Then in the MHS network at the receiving end 3, a handling machine 12, realizing the electronic mail mode at the receiving end, receives the electronic mail document and carries out a search in the field of requested delivery method. If the priority of delivery by facsimile communication is the highest, then the electronic mail message is transmitted to channel 13, which performs the functions of transmitting and receiving facsimile messages, and then is converted into a facsimile message. In this case, a message converted into a facsimile message is sent to the facsimile apparatus 5, which is the destination point (information addressee), through Switched Public Service Telephone Network 4 using the field of fax number.

Reference numerals 14 and 15 designate user personal computers at the receiving end.

In the described known system for communication of facsimile apparatuses, the use of a specialized directory control apparatus 11 increases expenditures on additional installation. If the characteristics of groups of resources controlled by a corresponding server or the configuration of the network often changes, then it cana turn out that information on a directory which is controlled by the directory control apparatus 11 does not coincide with the information for a real directory in a real time scale. Furthermore, problems may arise if the handling machine 12, realizing the electronic mail mode and selected using information on a directory, breaks down.

DISCLOSURE OF THE INVENTION

In accordance with the foregoing, the object of the present invention is to create a method and apparatus for transmitting electronic mail messages which ensure enhancement of the reliability of transmitting messages by providing service with the required type of electronic mail without using a specialized device to control the directories.

This object is achieved in a method for transmitting electronic mail in a local network, wherein forming a message and transmitting a formed message to a network unit is carried out in accordance with the message address in the electronic mail mode, in that in accordance with the invention, information on the type of electronic mail is introduced during the forming of the message, a routing table is formed and stored in each network unit, the routing table including an identifier of a network unit providing service, type of electronic mail service, evaluation of access to the network unit and access to the service, and information on the state of the network unit, during transmission of said message the network unit providing the required type of service is determined using the formed routing table and taking the degree of access to said network unit into account, a message is transmitted to a selected network unit in the electronic mail mode, the message received by said network unit using the address of the addressee of the received electronic mail is processed in accordance with the required type of service.

Wherein, it is preferable that when the configuration of the network or the type of service in any of the network units or its state is changed, changes in the routing table in each of the network units be carried out in real time.

The routing table is preferably formed on the basis of service messages periodically sent by each network unit with indication of the characteristics of this particular network unit, among them data on the accessibility of the type of service provided thereby.

Wherein, evaluation of the accessibility of the network unit may be obtained by statistically processing the stream of incoming service messages.

The aforesaid result is also achieved in an apparatus for transmitting electronic mail in a local network, the apparatus comprising a plurality of units of a local network, each of which comprising means for forming and transmitting an electronic mail message comprising information on at least the address of reception and the type of service for the electronic mail, means for routing the messages and a communication unit for coupling a corresponding unit of a local network with other units thereof, in that in accordance with the invention, each network unit comprises a queue dispatcher, an information input of which is an input for input of the message being transmitted, and an information output is connected to an input of a communication module, and the routing means includes therein means for forming a routing table comprising an identifier of a corresponding network unit, type of service provided for the electronic mail, evaluation of accessibility of a network unit and accessibility of service and information on its state, and also a unit for determining a message transmission route which is coupled bilaterally with means for forming a routing table, wherein an output for output of information on the type of service for the electronic mail and an input for input of information on identification of the network unit queue dispatcher are connected to corresponding input and output of the unit for determining a message transmission route.

Wherein, it is preferable that a unit for controlling the formation of a routing table be additionally introduced, an input of which is connected to an output for issuance of commands requesting changes in the communication unit, the output—to the control input of the unit for determining a message transmission route.

What is meant by the term "message" used in the application materials is a combination of user information (content) and service information (address and other attributes), having material embodiment in the form of a record by means of storage means (storage disks, memory cells), and electrical signals as means for moving the messages in the communication lines, network units.

Wherein message transmission should be understood to mean the physical movement of a message from one subscriber device to another such device, which is as a rule related to a change in the material representation of a message.

BRIEF DESCRIPTION OF THE DRAWINGS

The invention is explained by a description of a preferable embodiment with references to drawings in which.

DETAILED DESCRIPTION OF THE PREFERRED EMBODIMENT

Figure 1:
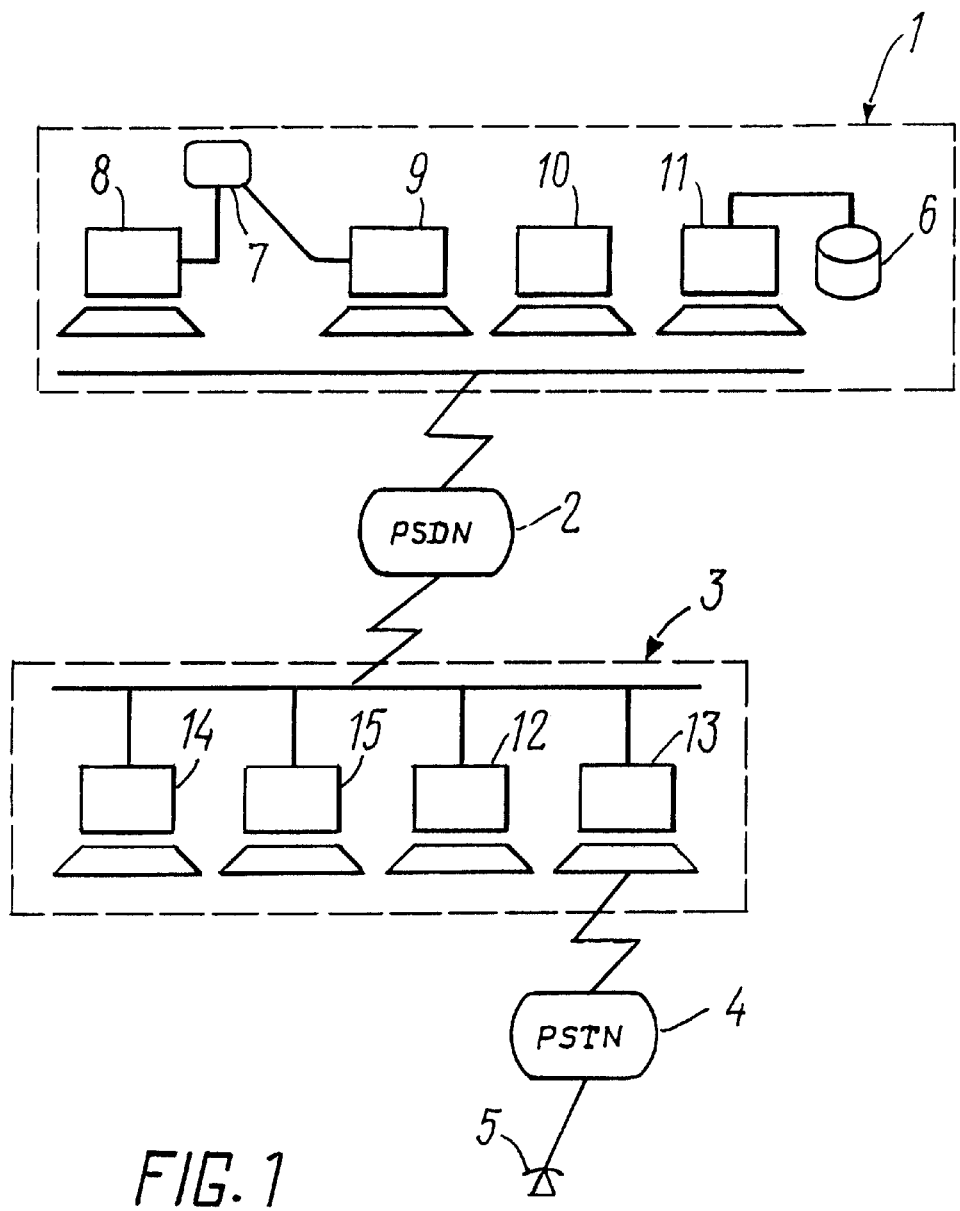
FIG. 1 shows a schematic representation of a known apparatus for coupling facsimile apparatuses.
Figure 2:
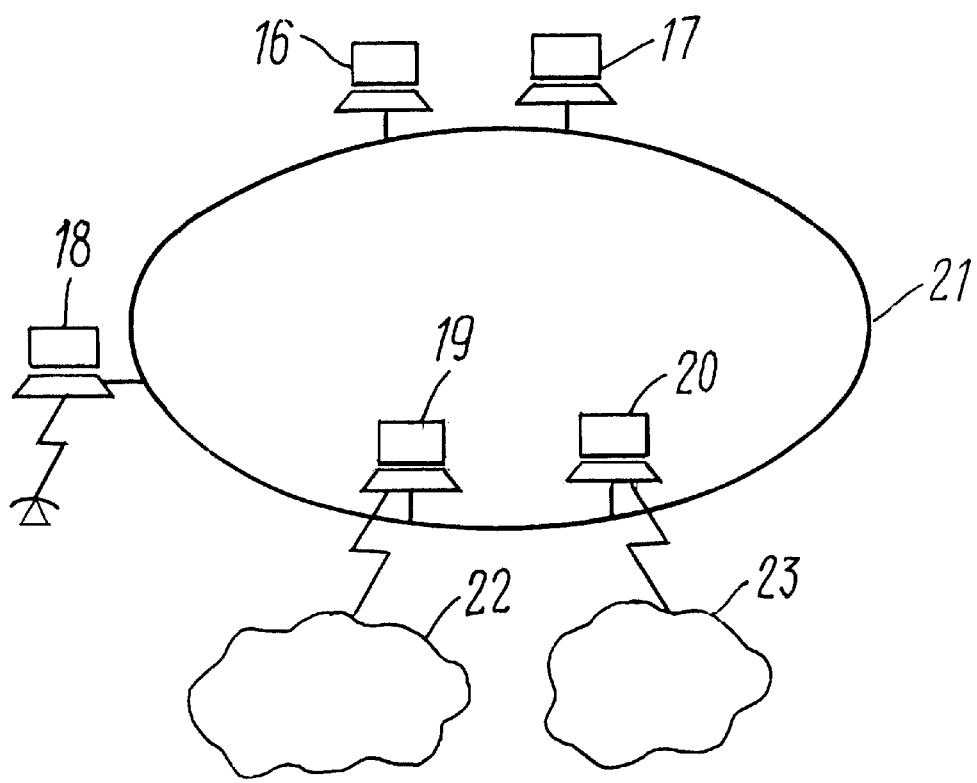
FIG. 2 shows a schematic representation of the configuration of a system in a local network, corresponding to the present invention.

Handling machines (below—network units) are designated in FIG. 2 by reference numerals 16–20, and a local network is designated by reference numeral 21. Wherein, the network unit 18 is a channel with the functions of sending facsimile messages (unit for servicing facsimile messages), network unit 19—a channel with the functions of sending electronic mail to a system for processing messages of another type 22, and network unit 20 is a channel for communication with the Internet network 23.

Corresponding network units 16–20 transmit and receive messages of the "electronic mail" type with the use of a protocol of interaction of equable systems. Units 18, 19, 20 also function as units which provide service for respectively facsimile messages, Internet type messages, and as a channel for communication with other types of electronic mail for the reception and/or delivery of mail.

The functions performed in accordance with the configuration described above are carried out in the following manner.

Each network unit 16–20 forms a routing table including data on the type of service for electronic mail, the name of the network unit serving as a channel to provide a certain type of service, data on the possibility of access to a network unit, data on the possibility of access to a service, and also information on the ON/OFF state for each network unit. In this case types of service presented by electronic mail are reception/transmission of facsimile messages, Internet network messages and electronic mail messages of another type of service for communication with a system for processing messages of another type, different from those indicated above. The indicated list of types of mail and types of provided service is presented as an example and may be supplemented with other types of mail and types of provided service, such as pager communication, sending messages in Sprint networks, and others.

If more than one network unit can provide one and the same type of service and function as a channel, then on the basis of integrated (complete) accessibility and corresponding type of service, the possibility exists for selection of the most suitable channel. The formed routing table is stored in each of the network units 16–20. If there is a change due to a change in the configuration of the network, a possible change in the type of service in any network unit or a change of its ON/OFF state, then the routing table will accordingly change in real time.

When an electronic mail message is written by a user, a corresponding network unit, i.e. a subscriber device—message sender, determines the network unit which is the destination point, using the routing table, taking into account the required type of service for the recorded electronic mail message and the accessibility of the channels providing a corresponding type of service. For example, if the type of electronic mail service is facsimile communication, then a search is made in the routing table for the most accessible network unit serving as a channel for transmitting facsimile messages, i.e. providing the "facsimile communication" type service.

When an electronic mail message is transmitted to a network unit providing the required type of service, this network unit serves as a channel for transmitting electronic mail to a system which is the reception point, using the reception address for electronic mail. In that case this network unit performs different functions corresponding to the provided type of service. For example, if service of the facsimile communication type is provided, then a corresponding network unit converts received electronic mail into the facsimile communication format and carries out transmission of the message in the facsimile communication network.

Figure 3:
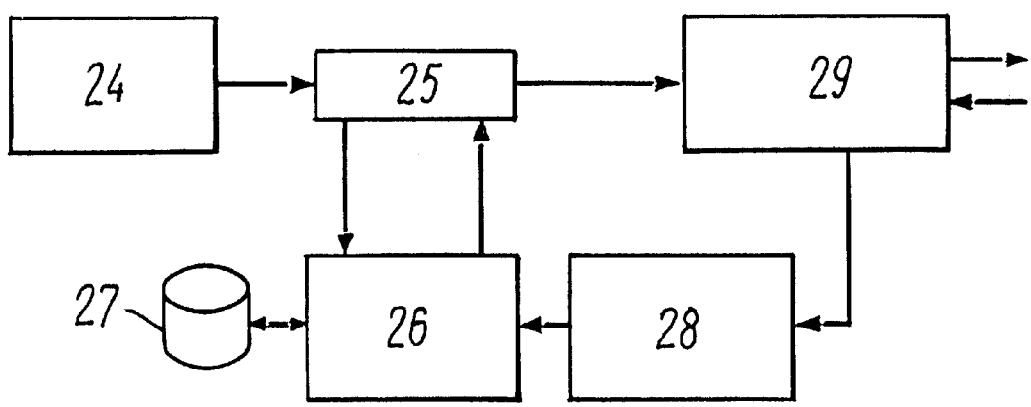
FIG. 3 shows a block diagram of a possible embodiment of a network unit ensuring the transmission and reception of electronic mail in accordance with the required type of service for electronic mail, in accordance with the invention.

FIG. 3 shows a block diagram explaining the mutual relationship between the transmission and reception of electronic mail in the network unit-sender and dynamic routing. Here reference numeral 24 designates a user program, reference numeral 25—a queue dispatcher, reference numeral 26—a unit for determining a message transmission route, reference numeral 27—a routing table, reference numeral 28—a unit controlling the formation of a routing table and reference numeral 29—a communication unit.

The user program 24, i.e. program for realization of the electronic mail procedure, is used by the user to write an electronic mail message.

The queue dispatcher 25 receives the electronic mail message, written by means of the user program 24, and then information is transmitted on the address of reception and on the required type of service for the electronic mail to unit 26 for determining a message transmission route. Furthermore, the queue dispatcher 25 receives information concerning the network unit—addressee from the unit 26 for determining the route and then enters that information into the electronic mail message which is then sent to the communication unit 29.

The unit 26 for determining a message transmission route controls the routing table 27, determines the network unit, which is the point of destination, depending on the information received from the queue dispatcher 25 on the receiving address and the type of service for electronic mail, and transmits information to the queue dispatcher 25 on a certain network unit which is the point of destination. Furthermore, the unit 26 for determining the route changes the routing table 27 in accordance with a request of the unit 28 controlling the formation of a routing table.

Figure 4:
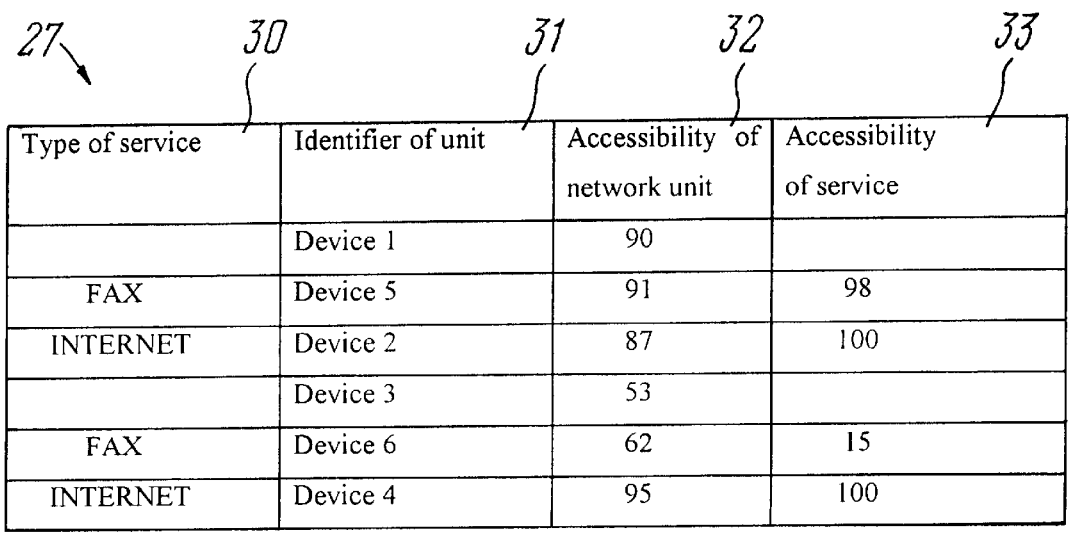
FIG. 4 shows an example of a routing table.

As shown in FIG. 4, the routing table 27 comprises entries for each network unit, among them: the type of presented service 30, provided by each network unit, an identifier of the network unit 31, evaluation of accessibility of the network unit 32, evaluation of accessibility of the service provided 33.

The communication unit 29 transmits and receives electronic mail, and also data for making a routing table, i.e. during its functioning communication unit 29 ensures the transmission of a message, comprising at least information on the network unit which is the point of destination and on the reception address, to another network unit. Furthermore, the communication unit 29 sends a command requiring changes in the routing table from another network unit to the unit 28 controlling the formation of a routing table.

The unit 28 controlling the formation of a routing table receives a request from the communication unit 29 to change the routing table and makes a change in the routing table 27 by means of a corresponding change request sent to the unit 26 for determining a message transmission route.

When the user writes the electronic mail message by means of the user program 24, the queue dispatcher 25 provides information on the reception address and the required type of service for the electronic mail to the unit 26 for determining a message transmission route. The unit 26 for determining the route carries out a search for the name of the network unit which may provide the required type of service for the electronic mail, using the routing table 27 shown in FIG. 4.

For example, if the user requests facsimile communication type service for transmission of the electronic mail, then unit 26 for determining the route determines the network unit with the identifier "Device 5" as the point of destination, this being the most accessible channel for providing facsimile communication, and sends information on the selected network unit to the queue dispatcher 25.

Then the queue dispatcher 25 sends the electronic mail and information on the network unit "Device 5," which is the point of destination, to the communication unit 29. The communication unit 29 sends the electronic mail to the network unit "Device 5." Wherein the network unit "Apparatus 5" receives the electronic mail and then converts it into the format of facsimile communication, after which it carries out transmission of the message over the facsimile communication network.

As described above, as distinctive over the usual method in which information on an invariable directory is used for each type of service provided by corresponding channels, the present invention provides for registering the constantly changing conditions of the network and characteristics of the state of each network unit in real time in the form of a routing table, thus providing the required type of service for electronic mail, using corresponding channels.

Industrial Applicability

The proposed invention can be used in systems for processing and transmitting messages in which there is operation with different types of messages.

What is claimed is:

1. In a method for transmitting electronic mail in a local network, wherein forming a message and transmitting the formed message to a selected one of network units is in accordance with a message address in an electronic mail mode, the improvements wherein:

information on a type of the electronic mail is introduced during the forming of the message, a routing table is formed and stored for each of the network units, the routing table including an identifier of each of the network units providing service, a type of electronic mail service provided by each of the network units, access to each of the network units and access to the type of the electronic mail service thereof, and information on states of the network units, during the transmitting of the formed message, one of the network units providing the type of the electronic mail service in accordance with the introduced information is selected using the routing table and the access to the network units therein, the formed message is transmitted to the selected one of the network units in the electronic mail mode, and the formed message transmitted to the selected one of the network units is processed therein in accordance with the type of the electronic mail service.

2. A method according to claim 1, characterized in that the routing table is formed on the basis of service messages periodically sent by each of the network units with indication of accessibility of the type of the electronic mail service thereat.

3. A method according to claim 1, characterized in that evaluation of the access of the network units is obtained by statistically processing a stream of the information on the type of the electronic mail.

4. A method according to claim 1, characterized in that the routing table is formed in real time.

5. A method according to claim 2, characterized in that evaluation of the access of the network units is obtained by statistically processing a stream of the information on the type of the electronic mail.

6. A method according to claim 2, characterized in that the routing table is formed in real time.

7. A method according to claim 3, characterized in that the routing table is formed in real time.

8. A method according to claim 5, characterized in that the routing table is formed in real time.

9. An apparatus for transmitting electronic mail in a local network (21), the apparatus comprising a plurality of units (16–20) of a local network, each of which comprising means for forming and transmitting an electronic mail message comprising information on at least the address of reception and type of service for the electronic mail, and also means for routing the messages and a communication unit (29) for coupling a corresponding unit of the local network with other units thereof, characterized in that:

each network unit (16–20) comprises a queue dispatcher (25), an information input of which is an input for input of the message being transmitted, and an information output is connected to an input of the communication module (29), and the routing means comprises means for forming a routing table (27) including an identifier of a network unit providing service, the type of service provided for the electronic mail, evaluation of accessibility of a network unit and accessibility of service and information on its state, and also a unit (26) for determining a message transmission to route which is coupled bilaterally with means for forming a routing table (27), wherein an output for output of information on the type of service for the electronic mail and an input for input of information on identification of the network unit queue dispatcher (25) are connected to corresponding input and output of the unit (26) for determining a message transmission route, wherein it further comprises a unit (28) controlling formation of the routing table, an input of which is connected to an output for issuance of commands requesting changes in the communication unit (29), the output—to the control input of the unit (26) for determining a message transmission route.

10. In an apparatus for transmitting electronic mail in a local network (21) comprising a plurality of network units (16–20), each of the network units (16–20) comprising means for forming and transmitting an electronic mail message comprising information on at least the address of reception and type of service for the electronic mail and a communication unit (29) for coupling the network units, the improvements wherein:

each of the network units (16–20) comprises a queue dispatcher (25) receiving the electronic mail for output through a communication module (29), routing means (27) forms a routing table identifying the network units providing service, the type of service provided for the electronic mail, evaluation of accessibility of the network units and accessibility of the service provided thereby, and information on states of the network units, and a unit (26) coupled bilaterally with the routing means (27) provides routing according to the routing table for the electronic mail to the queue dispatcher (25) and thereby the communication module (29).

11. An apparatus according to claim 10, characterized in that it further comprises a unit (28) controlling the routing table the routing means forms according to commands for changes from the communication unit (29).

* * * * *